O. F. TURNER & W. H. MAPLE.
COVER FOR TEA KETTLES.
APPLICATION FILED SEPT. 27, 1910.
1,024,607.
Patented Apr. 30, 1912.
2 SHEETS—SHEET 1.
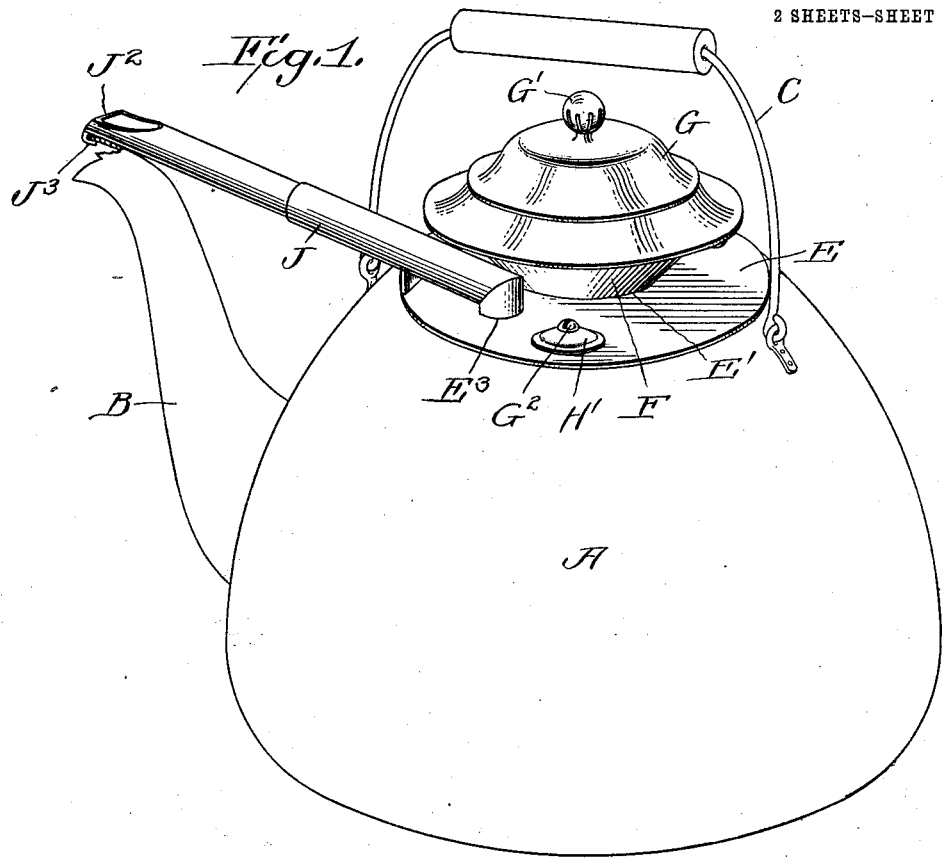
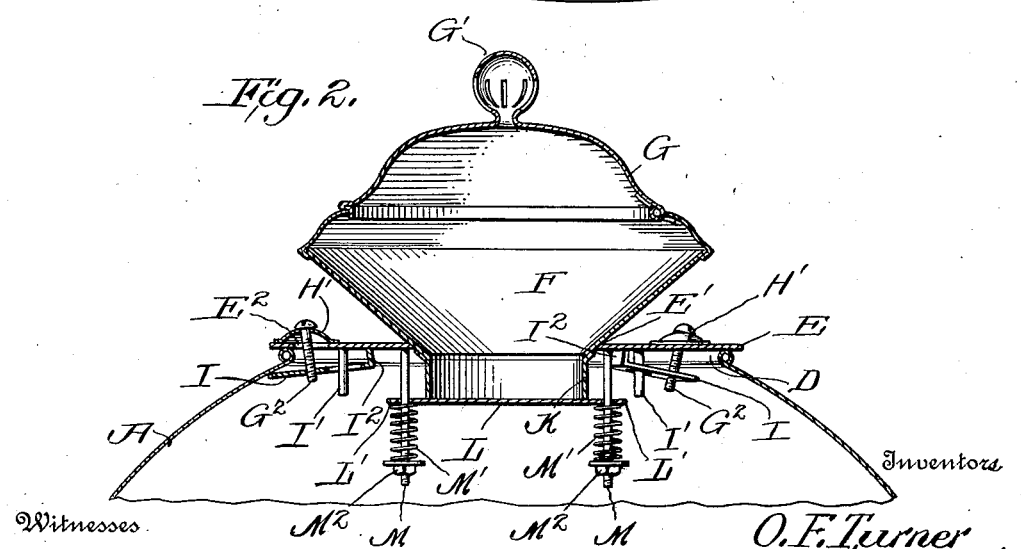

O. F. TURNER & W. H. MAPLE.
COVER FOR TEA KETTLES.
APPLICATION FILED SEPT. 27, 1910.
1,024,607.
Patented Apr. 30, 1912.
2 SHEETS—SHEET 2.
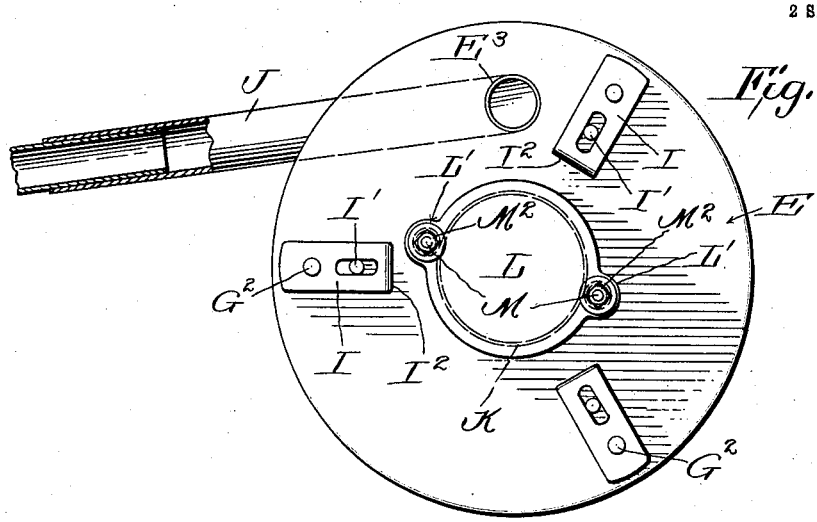
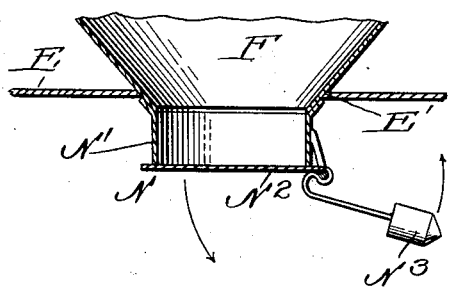
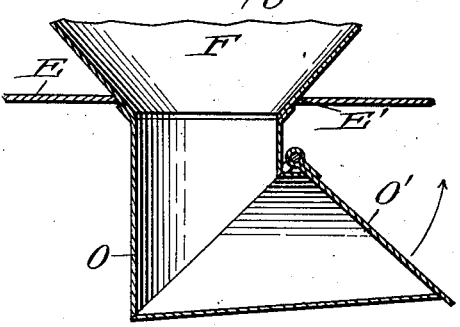
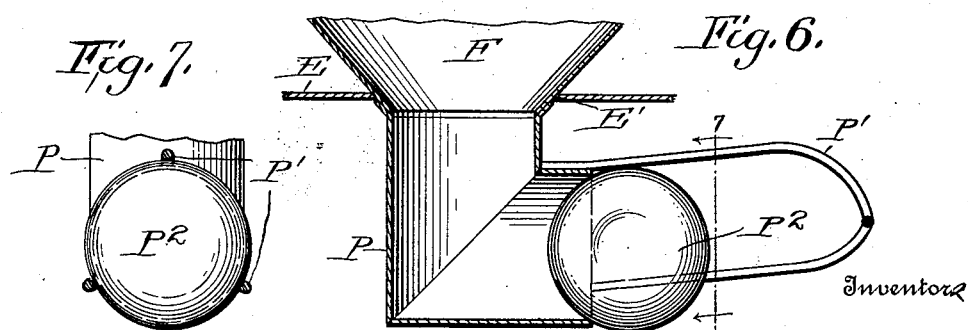
Witnesses
Oliver W. Holmes
Asa P. Wright
Inventors
O. F. Turner and
W. H. Maple
By Chas E. Brock
Attorney

UNITED STATES PATENT OFFICE.

OTTO F. TURNER AND WARREN H. MAPLE, OF PENDLETON, OREGON; SAID MAPLE ASSIGNOR TO SAID TURNER.

COVER FOR TEA-KETTLES.

1,024,607.  Specification of Letters Patent.  Patented Apr. 30, 1912.

Application filed September 27, 1910. Serial No. 584,101.

*To all whom it may concern:*

Be it known that we, OTTO F. TURNER and WARREN H. MAPLE, citizens of the United States, residing at Pendleton, in the county of Umatilla and State of Oregon, have invented a new and useful Improvement in Covers for Tea-Kettles, of which the following is a specification.

This invention relates to certain new and useful improvements in covers for tea kettles, the object being to provide a cover which is so constructed that the same can be easily and quickly adjusted to any size tea kettle, whereby water can be placed within the kettle without any danger of the hands being burned by the escaping steam.

A still further object of our invention is to provide a cover with a valve, which will be normally held closed, whereby the escape of steam through the cover is prevented, means being provided for conveying the steam generated out over the spout of the kettle.

Another object of our invention is to provide means for fastening the cover in position on the kettle, whereby the cover can be adjusted to suit any size kettle and when placed in position thereon, will be locked so as to form a tight joint in order to prevent the escape of steam.

A still further object of our invention, is to provide a sectional steam escape tube whereby the same can be lengthened or shortened, in order to adjust the same to different length spouts.

A still further object is to provide the end of the steam escape tube with means for preventing the condensed steam from dripping out of the same.

With these objects in view, the invention consists in the novel features of construction, combination and arrangement of parts, hereinafter fully described and pointed out in the claims.

In the drawing forming a part of this specification, Figure 1 is a perspective view of our improved cover showing the application of the same to a tea kettle. Fig. 2 is a vertical section through the same. Fig. 3 is an inverted plan view of the cover. Fig. 4 is a vertical section through a modified form of valve. Fig. 5 is a vertical section through still another form of valve. Fig. 6 is a vertical section through another form of valve. Fig. 7 is a transverse section taken on line 7—7 of Fig. 6.

In the drawing, A indicates a tea kettle of the ordinary construction, which is provided with a spout B, a handle C, and a filling opening D having a beaded edge, the above description being given so that the application of our improved cover can be readily understood.

In carrying out our improved invention, we employ a disk E, having a central opening E' over which is arranged a conical vessel F provided with a contracted upper portion, which is closed by a hinged lid G, having a central knob G', which is formed hollow, and is provided with slots so as to allow the escape of any steam which might be generated within the vessel, as will be hereinafter fully described. The disk E is provided with slots $E^2$ through which extend clamping bolts $G^2$, carrying washers H', said bolts working in threaded openings of clamping members I, which are slidably mounted on depending pins I' carried by the disks E, and are provided with angled inner ends $I^2$ for holding said clamping members away from the under face of the disk. The clamping members are adapted to be forced under the beaded edge of the filling opening of the kettle after the disk has been placed in position thereon, and by tightening the clamping bolts, the disk can be clamped on the kettle in such a manner that a tight joint will be formed.

This cover is adapted to take the place of the ordinary cover now in use on tea kettles, and is so constructed that the same can be readily placed in position on tea kettles of all sizes, as the disk is of such a size that it will cover any size opening, and it will be seen that by adjusting the clamping members, they can be moved so as to engage the edge of the opening of the kettle of any size.

Secured within an opening $E^3$ formed in the disk E is the angled end of a steam escape tube J, which is formed of two telescoping sections in order to allow the same to be adjusted to suit any length of spout of the kettle upon which the cover is placed, and the outer section of said tube is cut off obliquely, and is partly closed as shown at $J^2$, so as to prevent the dripping of water from the same caused by the condensed steam. The end of the tube is provided with a hook $J^3$, adapted to fit over the mouth of the spout of the kettle for holding the same thereon, and it will be seen that the steam generated within the kettle will be conveyed by the escape tube out over the mouth of the spout, in such a manner that all danger of the hands being burned by the escaping steam when the handle of the kettle is grasped is prevented.

Extending downwardly from the opening of the disk is a pipe section K, which forms a valve seat against which a valve L is adapted to be held, said valve being provided with apertured lips L', which are slidably mounted on depending bars M carried by the disk, said bars being surrounded by coiled springs M', and having their lower ends threaded on which are mounted nuts M² by means of which the tension of the springs can be adjusted so that the valve will be held tightly against the valve seat formed by the pipe, whereby the opening of the cover will be completely closed so that it will be impossible for any steam to escape through the same. It will be seen that when water is poured into the vessel, the weight of the same will compress the springs which will open the valve so as to allow the water to pass into the kettle in order to fill the same, and after the same has been filled, the valve will close itself so as to prevent the escape of steam.

In the modification shown in Fig. 4, we provide a weight controlled valve N, which comprises a pipe section N' which is secured to the disk in a similar manner to the pipe section K, and carries a hinged valve N² having a weighted lever N³ connected thereto for normally holding the same closed, and it will be seen that the weight of the water will counterbalance the weight of the lever so as to allow water to pass into the kettle after which the valve will close automatically.

In Fig. 5 we show a gravity controlled valve to be used in connection with a cover which comprises an elbow section O adapted to be secured to the disk in a similar manner, and is provided with an oblique edge on which is adapted to rest the hinged gravity valve O, in such a manner as to allow the water to pass through the same in order to fill the kettle after which the valve will close automatically.

In Figs. 6 and 7, we show a ball valve to be used in connection with a cover comprising an elbow section P having a frame P' connected thereto forming an inclined runway, in which is mounted a ball P² adapted to close the end of the pipe section in order to prevent the steam from escaping, and it will be seen that the pressure of the water passing into the kettle will unseat said ball in order to allow the kettle to be filled, and after the kettle has been filled the ball will seat itself by gravity in order to close the same to prevent the escape of steam through the cover.

From the foregoing description it will be seen that we have provided a cover for tea kettles, which is provided with a valve for closing the opening of the cover which communicates with the interior of the kettle in such a manner that the kettle can be readily filled, the valve opening to allow the water to pass into the same, and closing after the kettle has been filled.

What we claim is:—

1. The combination with a tea kettle, of a cover therefor, a steam escape pipe carried eccentrically by said cover, said pipe comprising telescoping sections, and a hook carried by the outer end of said pipe adapted to engage the kettle spout.

2. The combination with a tea kettle, of a cover therefor, a filling vessel carried by said cover, a steam escape pipe carried by the cover and to one side of the vessel, and means carried by said pipe for engagement with the kettle spout.

3. The combination with a tea kettle, of a flat cover, means carried by said cover for clamping the edges of the kettle opening, a vessel carried centrally by said cover and projecting above and below the cover, a hinged top carried by said vessel, a vertically movable bottom carried by the vessel, lips carried by said bottom, depending guide pins carried by the cover, the said pins passing loosely through said lips, springs arranged upon said pins bearing upwardly against said lips.

4. The combination with a tea kettle, of a cover arranged over said kettle having means for securing the same in position thereon, a vessel carried by said cover, a sectional steam escape pipe carried by said cover having means for connecting the same to the spout of the kettle, said pipe being closed at its end and partly cut out on top adjacent the end.

5. The combination with a tea kettle, of a disk arranged over the filling opening of the same, adjustable clamping members carried by said disk for securing the same in position thereon, a conical vessel carried by said disk provided with a cover, a pipe section carried by said disk, communicating with said vessel, a valve for closing said pipe section, and a steam escape pipe formed of telescoping sections carried by said disk having means at its end for connecting the same to the spout of the kettle.

OTTO F. TURNER.
WARREN H. MAPLE.

Witnesses:
C. H. Marsh,
Wm. Hemmelgarn.

Copies of this patent may be obtained for five cents each, by addressing the "Commissioner of Patents, Washington, D. C."